US012773744B2

(12) United States Patent
Paladin

(10) Patent No.: US 12,773,744 B2
(45) Date of Patent: Oct. 27, 2026

(54) ORBITAL WELDING SYSTEM FOR WELDING THE JOINTS OF TUBES OF TUBE PLATES OF HEAT EXCHANGERS

(71) Applicant: MAUS ITALIA SPA, Bagnolo Cremasco (IT)

(72) Inventor: Flavio Paladin, Crema (IT)

(73) Assignee: MAUS ITALIA SPA, Bagnolo Cremasco (IT)

( * ) Notice: Subject to any disclaimer, the term of this patent is extended or adjusted under 35 U.S.C. 154(b) by 814 days.

(21) Appl. No.: 18/248,762

(22) PCT Filed: Oct. 13, 2021

(86) PCT No.: PCT/IT2021/050328
§ 371 (c)(1),
(2) Date: Apr. 12, 2023

(87) PCT Pub. No.: WO2022/085035
PCT Pub. Date: Apr. 28, 2022

(65) Prior Publication Data

US 2023/0381879 A1 Nov. 30, 2023

(30) Foreign Application Priority Data

Oct. 19, 2020 (IT) ........................ 102020000024541

(51) Int. Cl.
*B23K 9/028* (2006.01)

(52) U.S. Cl.
CPC .................................. *B23K 9/0286* (2013.01)

(58) Field of Classification Search
CPC ................ B23K 37/02; B23K 37/0211; B23K 37/0229; B23K 37/0276; B23K 37/0282;
(Continued)

(56) References Cited

U.S. PATENT DOCUMENTS 3,612,808 A * 10/1971 Nelson ................. B23K 9/0284 200/82 R
3,715,560 A * 2/1973 Emmerson ........... B23K 9/0286 219/108
(Continued)

FOREIGN PATENT DOCUMENTS

CN 2810889 Y 8/2006
CN 105880830 A 8/2016
(Continued)

OTHER PUBLICATIONS

Jun et al., "Automatic welding machine for air inlet pipe of engine," CN 109454395, Mar. 12, 2019 (Year: 2019).*
(Continued)

*Primary Examiner* — Nathaniel E Wiehe
*Assistant Examiner* — Joshua R Beebe
(74) *Attorney, Agent, or Firm* — NIXON & VANDERHYE

(57) ABSTRACT

Disclosed is an orbital welding system for welding the joints of tubes of tube plates of heat exchangers, including: a programmer generator; an orbital welding head; and a first supply line of an inert gas for TIG welding. The orbital welding head includes: a welding torch; a stopping system for the torch against a tube plate; an expandable centring tool for fixing the orbital welding head at one of the tubes; an actuator for the centring tool; and a second supply line for a pressurized gas to operate the actuator. In the orbital welding system, the second supply line for a pressurized gas is branched off at a point from the first supply line and carries the same inert gas.

9 Claims, 5 Drawing Sheets

(58) Field of Classification Search
CPC ........ B23K 37/053; B23K 9/29; B23K 9/291; B23K 9/296; B23K 9/167; B23K 9/173; B23K 9/028; B23K 9/0286; B23K 2101/14; B23K 2101/06
See application file for complete search history.

(56) References Cited

U.S. PATENT DOCUMENTS

| | | | | |
|---|---|---|---|---|
| 4,084,739 | A | 4/1978 | Koltz et al. | |
| 4,483,477 | A | 11/1984 | Eckold et al. | |
| 4,935,081 | A * | 6/1990 | Becking | B29C 66/8324 264/145 |
| 2015/0028082 | A1* | 1/2015 | Miller | B23K 37/0264 228/2.1 |
| 2015/0239058 | A1* | 8/2015 | Buescher | B23K 9/167 219/137.31 |
| 2021/0178507 | A1* | 6/2021 | Rezapour | H05H 1/34 |

FOREIGN PATENT DOCUMENTS

| | | | |
|---|---|---|---|
| CN | 206662506 | U | 11/2017 |
| CN | 109454395 | A | 3/2019 |
| JP | H10249524 | A | 9/1998 |

OTHER PUBLICATIONS

International Search Report and Written Opinion of the ISA for PCT/IT2021/050328, mailed Jan. 3, 2022, 10 pages.
Office Action, issued in Chinese Patent Application No. 202180071273.3 dated Jun. 7, 2025.

* cited by examiner

ORBITAL WELDING SYSTEM FOR WELDING THE JOINTS OF TUBES OF TUBE PLATES OF HEAT EXCHANGERS

This application is the U.S. national phase of International Application No. PCT/IT2021/050328 filed Oct. 13, 2021, which designated the U.S. and claims priority to IT Patent Application No. 102020000024541 filed Oct. 19, 2020, the entire contents of each of which are hereby incorporated by reference.

TECHNICAL FIELD OF APPLICATION

The present invention relates to the mechanical industry sector.

More in detail, the invention relates to an orbital welding system for welding the joints of tubes of tube plates of heat exchangers.

A very important field of use for orbital welding is that of heat exchangers inside which there are perforated tube plates on which bundles of tubes—of materials that can range from carbon steel to stainless steels, nickel alloys to titanium, when maximum corrosion resistance is required—must be welded.

In orbital welding processes, the welding torch is mechanically rotated around the tube by 360° and beyond in a continuous process.

The tube-plate orbital welding is almost always carried out with TIG (Tungsten Inert Gas) technology which uses non-consumable tungsten electrodes, without or with the use of filler wire, if necessary.

PRIOR ART

A large number of factors can influence welding results: arc length, current pulsation frequency and amplitude, feed rate, shielding gas, type of base material, filler material, joint preparation, thermal conductivity, etc.

It is very difficult to achieve high standards of quality and safety with manual welding. This is due, among other things, to the welding position, such as vertical descending, overhead, vertical ascending, which can lead to defective welds precisely because of the gravitational force and the difficulty of movement that the operator has in these positions. If one wants to have complete control over the weld pool, a perfect balance is needed between the effects of gravity and surface tension in any position of the torch. Using mechanized equipment, these manage the welding process appropriately and automatically, despite the fact that the operator must always follow and control the progress of the cycle. In an ideal situation, all parameters should be fully programmed before starting welding. In automatic welding, the welding process takes place in a completely independent and programmed manner, without the need for the operator's intervention.

The main components of an automated TIG orbital tube welding system are: a generator with programming control, an orbital welding head, a cooling system, an inert gas supply line to protect the welding, and, where required, a filler wire feeder.

The gas normally used is argon or a mixture of argon with the addition of helium or hydrogen in a limited percentage.

The welding head substantially comprises: a welding electrode holder torch, a stop system for said torch against the tube plate, an expandable centring tool to lock said welding torch at one of said tubes, an actuator to activate said centring tool, a second pressurized air supply line to operate said actuator.

The welding torch, the expandable centring tool, the actuator with its compressed air supply line are mounted on a rotary joint.

Centring tools of the known type comprise an axial rod on which two elastic locking grippers are mounted, opposite each other, which, by expanding radially inside the tube being processed, lock the welding head against the tube plate in cooperation with the stop system.

Each gripper deforms as a result of the insertion of an expander cone dragged by the rod of the centring tool.

The actuator for controlling said centring tool, which acts on said rod to pull it and thus cause the insertion of expander cones in the elastic grippers, comprises a single-acting pneumatic piston fed by the compressed air circuit.

Such orbital welding systems have some limitations and drawbacks.

The main drawback is the use of compressed air to control the centring tool actuator.

To operate said centring tool, the compressed air used must have a minimum pressure of 6-7 bar. Bringing compressed air with such a pressure inside the rotating joint of the welding head involves the risk that any leakage (even minimal) of the gaskets of the joint itself, contaminates the inert gas dedicated to the protection of the welding, usually emitted at a pressure significantly lower by about 0.5 bar. Compressed air can contaminate the working atmosphere of the torch and cause unwanted blowing and porosity in the weld.

Furthermore, the compressed air supply line has a large footprint on the welding head and requires connections and deviations with circuits external to the welding system, thus creating logistical constraints.

The known centring tools, necessary for locking the welding head to the tube plate, also have drawbacks.

The two elastic grippers are activated by a single actuator, but disadvantageously they cannot expand simultaneously. The opening of the two grippers does not occur simultaneously: one of the two grippers, in cooperation with the corresponding expander cone, expands before the other and the centring of the tool in the tube is no longer guaranteed.

Furthermore, there are no means for expelling the cones from the grippers once the work is finished and the centring tool must be extracted: the normal extraction movement of the centring tool involves always acting on the rod with a sort of traction, which risks expanding the grippers again.

Having to act on two grippers with a single actuator, the expansion that is obtained is limited: consequently, different centring tools of different diameters are needed to cover all the possible dimensions of the tubes, with a consequent economic disadvantage on the overall costs of the system.

DISCLOSURE OF THE INVENTION

The invention aims to overcome these limits by defining an orbital welding system for welding the joints of tubes of tube plates of heat exchangers which guarantees precise welding, which is efficient, totally automated, easy to maintain.

It is also an object of the invention to provide a welding head which is self-supporting, guarantees stability and centring of the torch even without manual intervention by operators and which can be easily moved from the welded tube to a new tube to be welded, by extracting and reinserting the centring tool.

Such objects are achieved by an orbital welding system for welding the joints of tubes of tube plates of heat exchangers comprising:

a programmer generator;

an orbital welding head;

a first supply line of an inert gas for TIG welding, where said orbital welding head comprises:

a welding torch;

a stopping system for said torch against a tube plate;

an expandable centring tool for fixing said orbital welding head at one of said tubes;

an actuator for said centring tool;

a second supply line for a pressurized gas to operate said actuator, wherein said orbital welding system is characterized in that said second supply line for a pressurized gas is branched off at a point from said first supply line and carries the same inert gas.

According to a first aspect of the invention, said second supply line comprises a pressure multiplier device provided at said branching point.

Furthermore, said first feed line comprises a pressure reducing device.

In a preferred variant of the invention, said second supply line comprises a pneumatic valve which manages the passage of gas in said actuator for the actuation of said expandable centring tool.

Advantageously, said pneumatic valve is of the three-way type, to allow gas discharge from said actuator and disengagement from the tube of said expandable centring tool.

According to a preferred embodiment of the invention, said expandable centring tool comprises:

a radial guide cartridge provided with balls;

an elastic axial locking gripper;

a traction rod associated with said actuator, on which said guide cartridge and said elastic gripper are rotatably associated.

Advantageously, a thrust bearing is interposed between said guide cartridge and said elastic gripper.

In particular, said centring tool comprises:

a thrust head integral with said traction rod;

an expander cone adapted to act on said elastic gripper by effect of said thrust head, against the elastic action of a helical expulsion spring;

a thrust bearing interposed between said thrust head and said expander cone.

According to a further aspect of the invention, said actuator comprises a piston and an eccentric control lever, where a first end of said eccentric control lever is associated with said piston and a second end of said eccentric control lever is associated with said traction rod of said centring tool.

Preferably, said actuator comprises reversible constraint means arranged between said second end of said eccentric control lever and said traction rod.

The invention has numerous advantages set out below.

The main advantage of the invention consists in the use of the same inert gas, already used for the protection of the welding, also for the activation of the centring tool.

The gas supply line to the actuator is a branching of the inert gas supply line to the welding torch: advantageously, the overall dimensions of the system are therefore reduced, and there is no need for connections to other external compressed air pneumatic lines.

The elimination of compressed air reduces the risk of blowing and accidental porosity in the welding because, even if there were gas leaks from the actuator and in the proximity of the electrode, these leaks would not be air under pressure, but the inert gas itself which usually stabilizes the weld.

The resulting weld is therefore more precise and free of imperfections and burrs. The risk of the weld dripping is also considerably reduced, with unwanted shrinkage of the tube hole, which could make it difficult to extract the centring tool.

The pressure multiplier device placed on the second gas supply line to the actuator allows the most suitable working pressures (up to 7-8 bar) to be reached. Vice versa, the demultiplier device placed on the first gas supply line to the welding torch allows the gas pressure to be reduced up to 0.5 bar, that is to the recommended value for the success of a perfect welding, without waste and consumption.

The centring tool according to the invention works on two fronts: the guide cartridge with spring-loaded balls works radially and ensures positioning of the tool in axis with the tube, while the elastic gripper with its expansion blocks the tool longitudinally, allowing the anchoring of the orbital welding head to the tube plate of the tube to be welded.

Even the operator is no longer required to support the orbital head during welding: the orbital head remains fixed to the tube plate by virtue of the centring tool.

The centring tool according to the invention therefore guarantees centring and stability to the orbital head during the welding step, and at the same time ensures easy and correct extraction of the tool itself from the tube after welding.

In fact, the helical expulsion spring of the expander cone facilitates the return of the elastic gripper to a rest configuration, to facilitate the extraction of the centring tool from the tube, without the risk that the gripper itself remains partially engaged by the expander cone.

Unlike the prior art, the actuator must act on a single elastic gripper and, with the same force and traction stroke exerted by the actuator, the expansion of the gripper is greater. Being able to reach greater expansions of the gripper, in addition to being able to use a single centring tool for tubes with diameters included in a wide range, it is possible to maintain a reduced diameter of the centring tool, thus facilitating its extraction from the tube even in the case of light overflow of the weld with partial obstruction of the tube mouth.

The reversible constraint means between the actuator lever and the traction rod of the centring tool facilitate the maintenance operations of the welding head but, even more advantageously, facilitate the extraction of the centring tool in case of partial obstruction of the tube mouth again due to overflows of the weld. In fact, it will be sufficient to act on such reversible constraint means to release and remove the orbital welding head and all accessories, actuator included, from the tube plate, leaving only the centring tool inside the tube and the space necessary for the operator to work and remove the tool.

BRIEF DESCRIPTION OF THE DRAWINGS

The advantages of the invention shall appear more clearly from the following description of a preferred embodiment, made by way of an indicative and non-limiting example with reference to the figures, in which.

DETAILED DESCRIPTION OF A PREFERRED EMBODIMENT OF THE INVENTION

Figure 1:
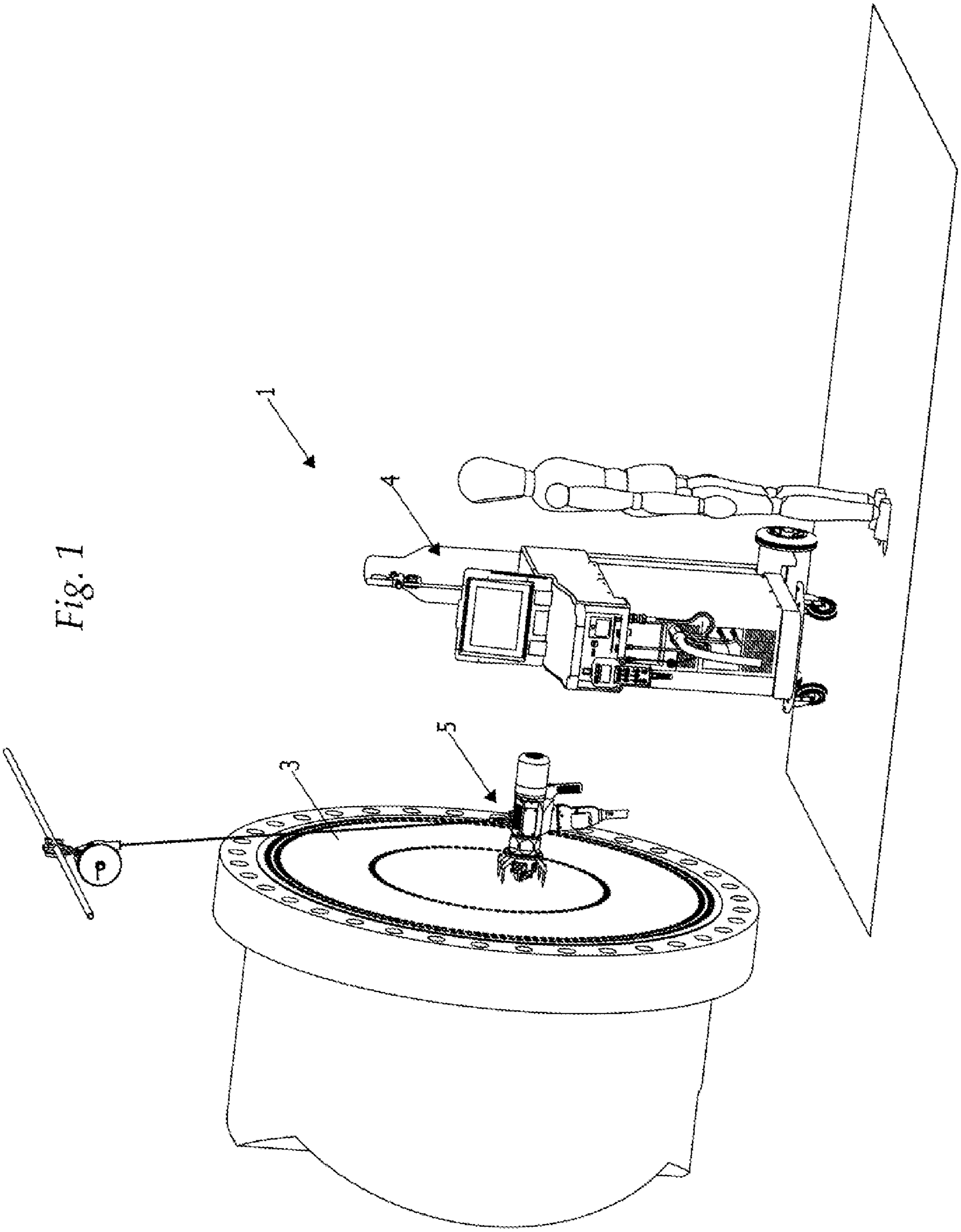
FIG. 1 shows an axonometric view in its main components of an orbital welding system for welding the joints of tubes of tube plates of heat exchangers according to the invention.
Figure 2:
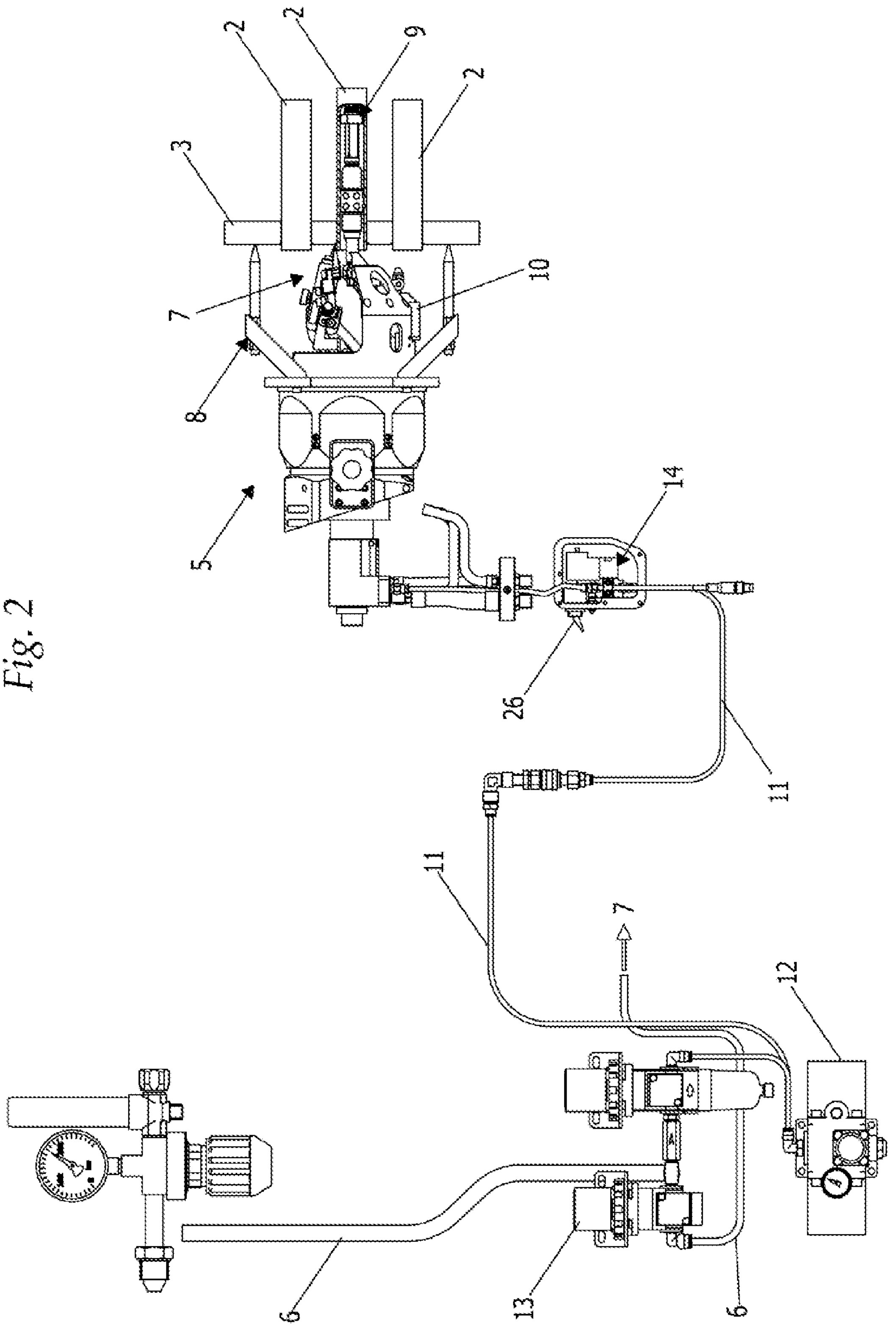
FIG. 2 shows a schematic view of part of the system of FIG. 1.

With particular reference to FIGS. 1 and 2, an orbital welding system 1 with TIG technique for welding the joints of tubes 2 of tube plates 3 of heat exchangers is shown.

Said orbital welding system 1 essentially comprises:

- a programmer generator 4;
- an orbital welding head 5;
- a first supply line 6 of an inert gas, for example Argon, for TIG welding.

Said first supply line 6 is normally directly branched off a cylinder and the gas pressure inside it is generally between 2.4 and 4 bar.

Figure 3:
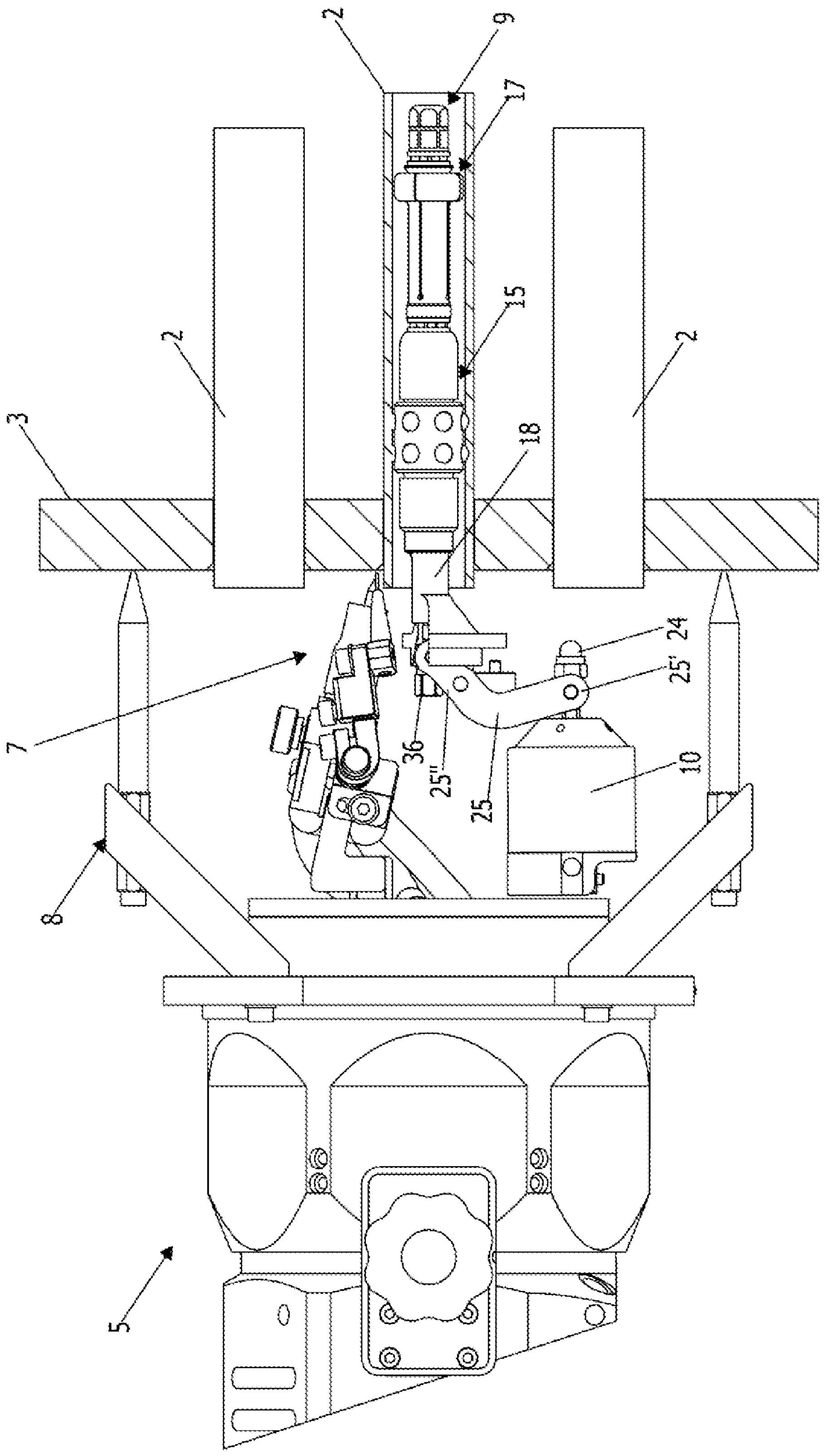
FIG. 3 shows a partially sectional side view of a component of the welding system of FIG. 1 in operation.
Figure 4:
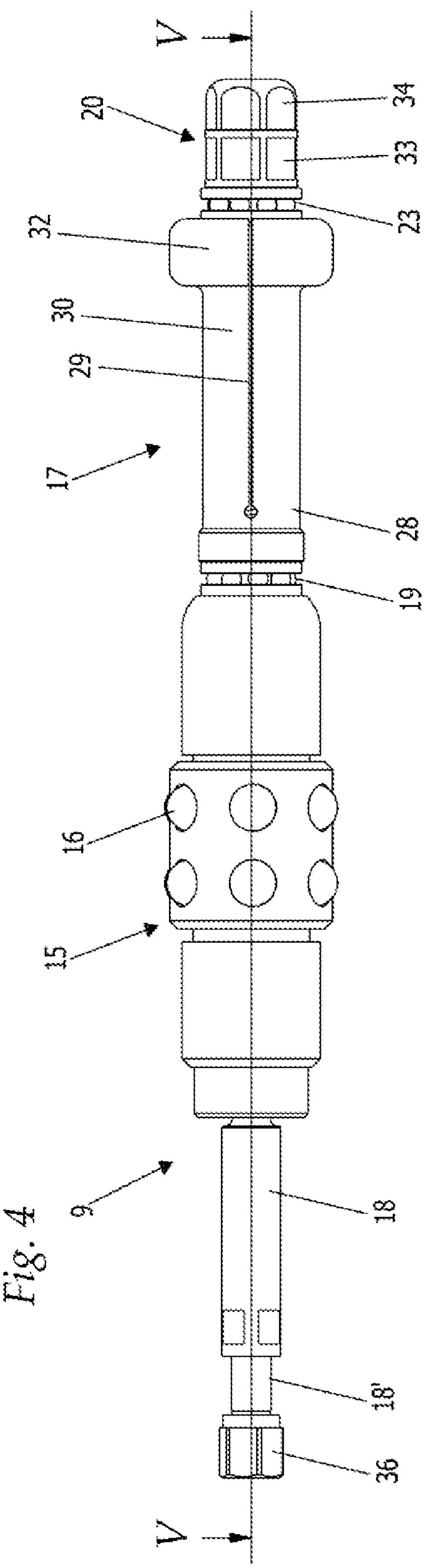
FIGS. 4 and 5 show a lateral and longitudinal sectional view of a component of the system according to the invention, in the rest step.
Figure 5:
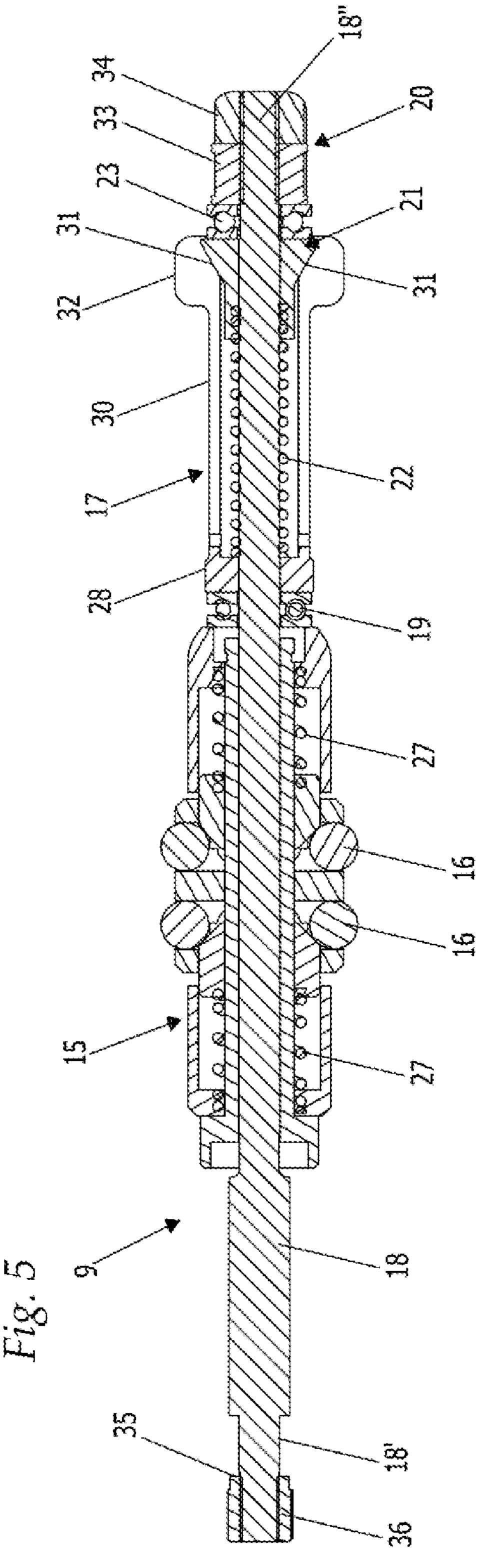
Figure 6:
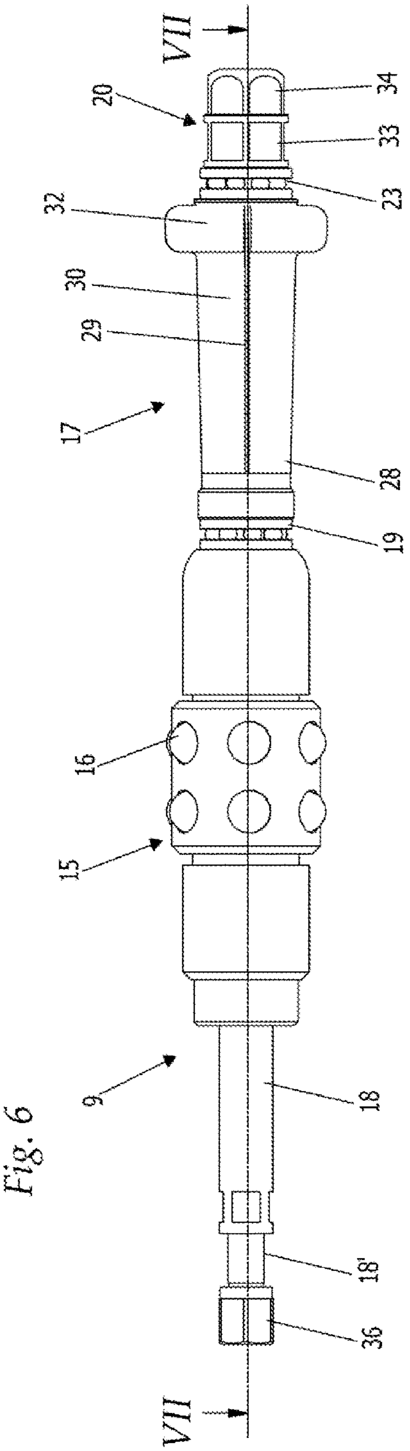
FIGS. 6 and 7 show a lateral longitudinal sectional view of a component of the system according to the invention, in the working step.

Said orbital welding head 5, clearly visible in the detail of FIG. 3, comprises:

- a welding torch 7;
- a tip stopping system 8 for said torch 7 against a tube plate 3;
- an expandable centring tool 9 for said welding torch 7 at one of said tubes 2 to be welded.

Said centring tool 9 allows a stable anchoring of the orbital welding head 5 to the tube plate 3, even without the contribution of an operator. The orbital welding head 5 can only be hung on a cable for greater safety during the extraction and positioning operations.

Said orbital welding head 5 then comprises an actuator 10 for said centring tool 9. Said actuator 10 comprises a single-acting pneumatic piston 14 and said orbital welding head 5 comprises a second line 11 for supplying a pressurized gas to operate said actuator 10.

Advantageously, the inert gas used as protection gas for welding is the same gas used for the operation of said actuator 10 and its supply line, or said second line 11, is directly branched off the first main supply line 6 which carries the inert gas in the proximity of the welding electrode of the torch 7.

The point where Argon is taken from said first line 6 to supply said second supply line 11 is called the branching point.

At said branching point, said second supply line 11 comprises a pressure multiplier device 12 necessary to bring the gas pressure of the first line 6 to a value between 5 and 8 bar.

Said second supply line 11 comprises a pneumatic valve 14 which manages the passage of gas in said actuator 10 for the actuation of said expandable centring tool 9. Said pneumatic valve 14 comprises a manual switch 26, on which the operator acts directly, to activate or deactivate the expansion of the centring tool 9 inside the tube 2.

Said pneumatic valve 14 is placed along said second supply line 11 in proximity to said orbital welding head 5, in order to minimize the response time of the actuator 10 and limit the consumption of gas under pressure.

Said pneumatic valve 14 is of the three-way type to also allow the residual gas present in said actuator 10 to be discharged into the atmosphere when the elastic gripper 17 is not active and the centring tool 9 is disengaging the tube 2.

Along said first supply line 6, on the other hand, a pressure reducing device 13 is arranged, suitable for reducing the pressure of the Argon gas, from the value of 2.4-4 bar to a value of approximately bar, or at the most suitable pressure value at which the gas must work for welding protection.

With particular reference to FIGS. 4-7, said expandable centring tool 9 comprises:

- a guide cartridge 15 provided with spring-preloaded balls 16;
- an elastic locking gripper 17 which works by expansion;
- a traction rod 18 associated at one of its ends 18' with said actuator 10, on which both said guide cartridge 15 and said elastic gripper 17 are rotatably associated.

Said guide cartridge 15 comprises a plurality of floating balls 16, free to move in a radial direction to vary their projection with respect to the external diameter of the guide cartridge 15 and therefore vary the diameter of the centring tool 9. The movement of said balls 16 occurs in cooperation with helical springs 27 inside said guide cartridge 15.

Said elastic gripper 17 comprises an axially perforated cylinder 28 in which said traction rod 18 is inserted. Said cylinder 28 is provided with longitudinal cuts 29 which form flexible elastic arms 30. The free ends of said elastic arms 30 are shaped and include internal inclined planes 31 and external jaws 32. The latter will cooperate, when the elastic gripper 17 is expanded, with the internal surface of the tube 2.

Said traction rod 18 comprises at a second end 18" thereof, opposite the end 18' of constraint to the actuator 10, a thrust head 20, made by means of a nut 33 and a lock nut 34.

A thrust bearing 19 is interposed between said guide cartridge 15 and said elastic gripper 17, so as to make the respective rotation around said traction rod 18 independent. In use, in fact, when the centring tool 9 is active inside the tube 2 to be welded, said ball guide cartridge 15 is free to rotate with said traction rod 18 (except to compensate for any friction with the rotation of the balls 16), while said elastic gripper 17 is in an expanded position and with its external jaws 32 blocked against the internal surface of the tube 2 (the traction rod 18 instead rotates freely inside the cylinder 28 of the elastic gripper 17).

Said centring tool 9 comprises an expander cone 21 for said elastic gripper 17.

Said expander cone 21 is adapted to act on said elastic gripper 17 by effect of said thrust head 20 against the elastic action of a helical expulsion spring 22 provided inside the cylinder 28 with said elastic gripper 17 and wound around said pull rod 18.

Figure 7:
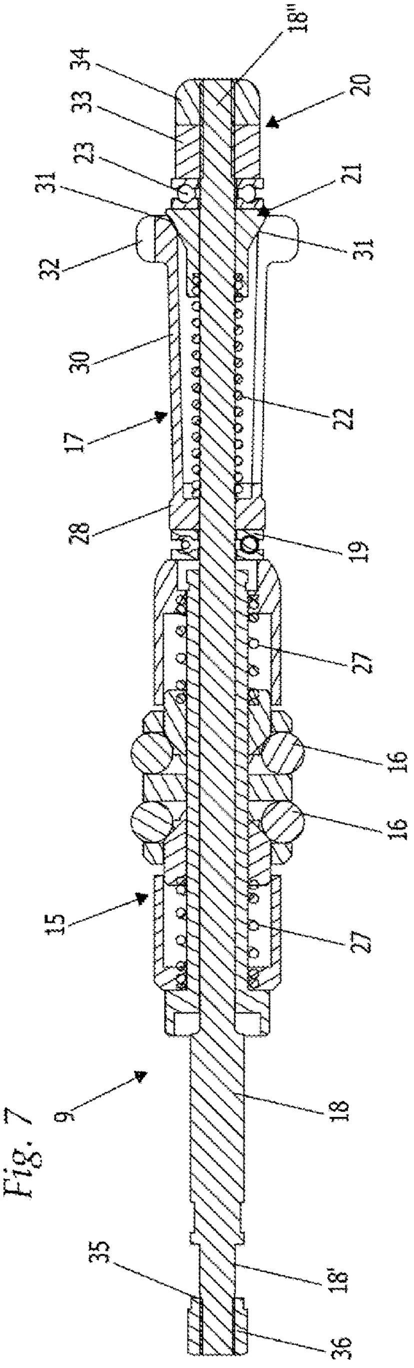

With reference to the section of FIG. 7, the progressive insertion of said expander cone 21 inside the elastic arms 30 of the gripper 17, favoured by the cooperation between the inclined planes 31 and the conicity of the expander cone 21, causes the expansion of the gripper itself and the widening of the external jaws 32 which will anchor to the internal surface of the tube 2.

Since the thrust head 20 and the traction rod 18 are free to rotate in axis with the tube 2 during welding, with respect to the elastic gripper 17 which, engaged by the expander cone 21, remains stationary and locked in the expanded position, between said head thrust bearing 20 and said expander cone 21 a thrust bearing 23 is interposed which eliminates possible friction.

Particularly advantageous is the method of coupling the actuator 10 to the traction rod 18 of the centring tool 9.

Said actuator 10 comprises a piston 24 and an eccentric control lever 25, where a first end 25' of said eccentric control lever 25 is associated with said piston 24 and a second end 25" of said eccentric control lever 25 is associated with said traction rod 18 of said centring tool 9.

Said second end 25" of said eccentric control lever 25 is U-shaped and engages the end 18' of the traction rod 18, held against extraction by a stop plane 35.

Advantageously, said actuator 10 comprises reversible constraint means arranged between said second end 25" of said eccentric control lever 25 and the end 18' of said traction rod 18. In the variant illustrated, said reversible constraint means are represented by a nut 36 screwed onto said traction rod 18. Said nut 36 forms the stop plane 35 which opposes the extraction of the second end 25" of the eccentric control lever 25.

The possibility of easily releasing the centring tool 9 from the actuator 10, and therefore from the main block of the orbital welding head 5, is particularly advantageous when the condition of excessive overflow of the weld occurs such as to limit the outlet diameter of tube 2 to a value less than the minimum diameter of the centring tool 9 when not expanded.

When this condition occurs, the solution object of the invention allows, once the welding torch 7 has been moved away from the tube plate 3, to disconnect the centring tool 9 from the actuator 10 by unscrewing, with a simple tool, the rear nut 36 of the traction rod 18. With the entire orbital welding head 5 removed from the tube plate 3, only the centring tool 9 remains inside the tube 2 which can be pushed out at the opposite end of the tube or extracted directly after milling the overflow of the weld. In both cases the centring tool 9 is not damaged and can be reassembled on the orbital welding head 5 for subsequent use.

The invention claimed is:

1. An orbital welding system for welding joints of tubes of tube plates of heat exchangers, the orbital welding system comprising:

a programmer generator;

a first supply line of an inert gas for Tungsten Inert Gas (TIG) welding; and an orbital welding head comprising a welding torch, a stopping system for said welding torch against a tube plate, an expandable centering tool configured to fix said orbital welding head at one of said tubes, an actuator for said centering tool, and a second supply line for a pressurized gas to operate said actuator, said second supply line being branched off at a point from said first supply line and carrying the same inert gas, wherein said expandable centering tool comprises:

a radial guide cartridge provided with balls, an elastic axial locking gripper, and a traction rod associated with said actuator, on which said radial guide cartridge and said elastic axial locking gripper are rotatably associated.

2. The orbital welding system according to claim 1, wherein said second supply line comprises a pressure multiplier device provided at said branching point.

3. The orbital welding system according to claim 1, wherein said first supply line comprises a pressure reducing device.

4. The orbital welding system according to claim 1, wherein said second supply line comprises a pneumatic valve which manages the passage of gas in said actuator for the operation of said expandable centering tool.

5. The orbital welding system according to claim 4, wherein said pneumatic valve is of a three-way valve configured to allow gas discharge from said actuator and disengagement from the fixed tube fixed by said expandable centering tool.

6. The orbital welding system according to claim 1, further comprising a thrust bearing interposed between said radial guide cartridge and said elastic axial locking gripper.

7. The orbital welding system according to claim 1, wherein said expandable centering tool further comprises:

a thrust head integral with said traction rod, an expander cone configured to act on said elastic axial locking gripper by effect of said thrust head, against the elastic action of a helical expulsion spring, and a thrust bearing interposed between said thrust head and said expander cone.

8. The orbital welding system according to claim 1, wherein said actuator comprises a piston and an eccentric control lever, a first end of said eccentric control lever being associated with said piston and a second end of said eccentric control lever being associated with said traction rod of said expandable centering tool.

9. The orbital welding system according to claim 8, wherein said actuator further comprises a reversible constraint system disposed between said second end of said eccentric control lever and said traction rod.

* * * * *